United States Patent [19]

Carter et al.

[11] 4,014,568
[45] Mar. 29, 1977

[54] PIPE JOINT

[75] Inventors: J. Warne Carter, Wichita Falls; Martin Duane Neher, Burkburnett, both of Tex.

[73] Assignee: Ciba-Geigy Corporation, Ardsley, N.Y.

[22] Filed: Feb. 27, 1976

[21] Appl. No.: 662,081

Related U.S. Application Data

[63] Continuation of Ser. No. 462,574, April 19, 1974, abandoned.

[52] U.S. Cl. .................... 285/39; 285/231; 285/356; 285/423; 285/DIG. 16
[51] Int. Cl.² ............................ F16L 35/00
[58] Field of Search ... 285/223, 260, 423, DIG. 16, 285/353, 356, 332.3, 231, 233, 234, 266, 39, 270, 271, 334.4

[56] References Cited

UNITED STATES PATENTS

| | | | |
|---|---|---|---|
| 2,294,160 | 8/1942 | Crone et al. | 285/423 X |
| 2,560,263 | 7/1951 | Wiegrand et al. | 285/356 X |
| 3,236,543 | 2/1966 | Mueller | 285/423 X |
| 3,701,548 | 10/1972 | McGuire | 285/DIG. 16 |

FOREIGN PATENTS OR APPLICATIONS

| | | | |
|---|---|---|---|
| 781,227 | 2/1935 | France | 285/356 |
| 1,953,778 | 6/1971 | Germany | 285/356 |

Primary Examiner—Dave W. Arola
Attorney, Agent, or Firm—Shapiro and Shapiro

[57] ABSTRACT

In a joint for pipe, a first sleeve surrounds and is bonded to the leading edge of a pipe section. A second sleeve, which acts as a male nut, is positioned on the pipe section rearward of the first sleeve, is externally threaded, and has an internal diameter greater than the diameter of the pipe section upon which it is mounted. An elastomeric spacer ring is positioned intermediate the two sleeves. A collar is bonded to and extends from an end of a second pipe section. The collar has an internally threaded portion adjacent its forward end for threaded engagement with the externally threaded second sleeve on the other pipe section, and has a second portion rearward of the threaded portion which is adapted to receive the first sleeve and spacer ring on the other pipe section. This second portion of the collar has an internal annular groove and a sealing ring in the groove for engagement by the first sleeve. The first sleeve is tapered with respect to the adjoining portion of the collar so that when the parts are connected, a ball and socket arrangement of predetermined angular capability is provided for the pipe sections while maintaining sealing engagement between the sealing ring and the adjoining sleeve.

7 Claims, 5 Drawing Figures

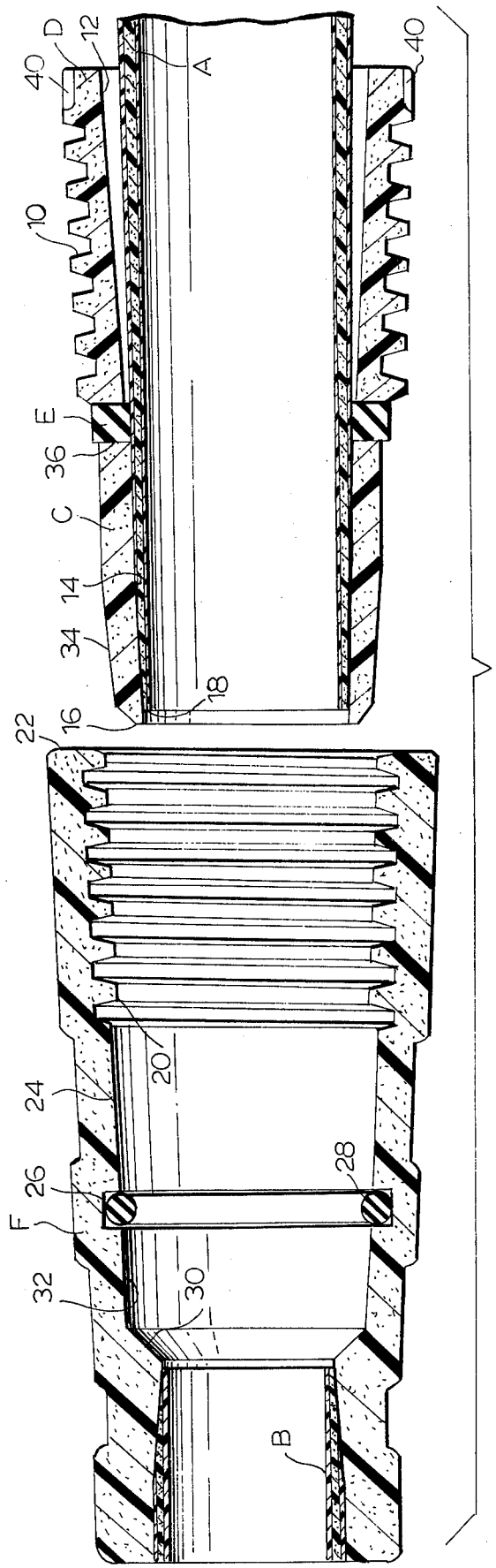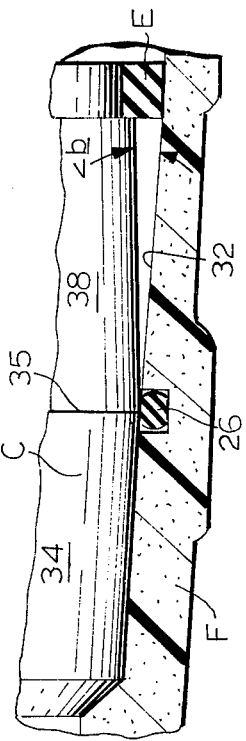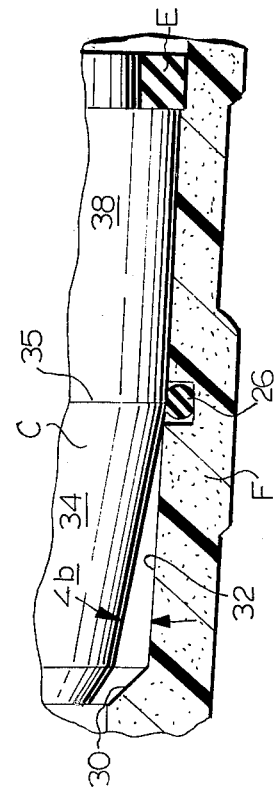

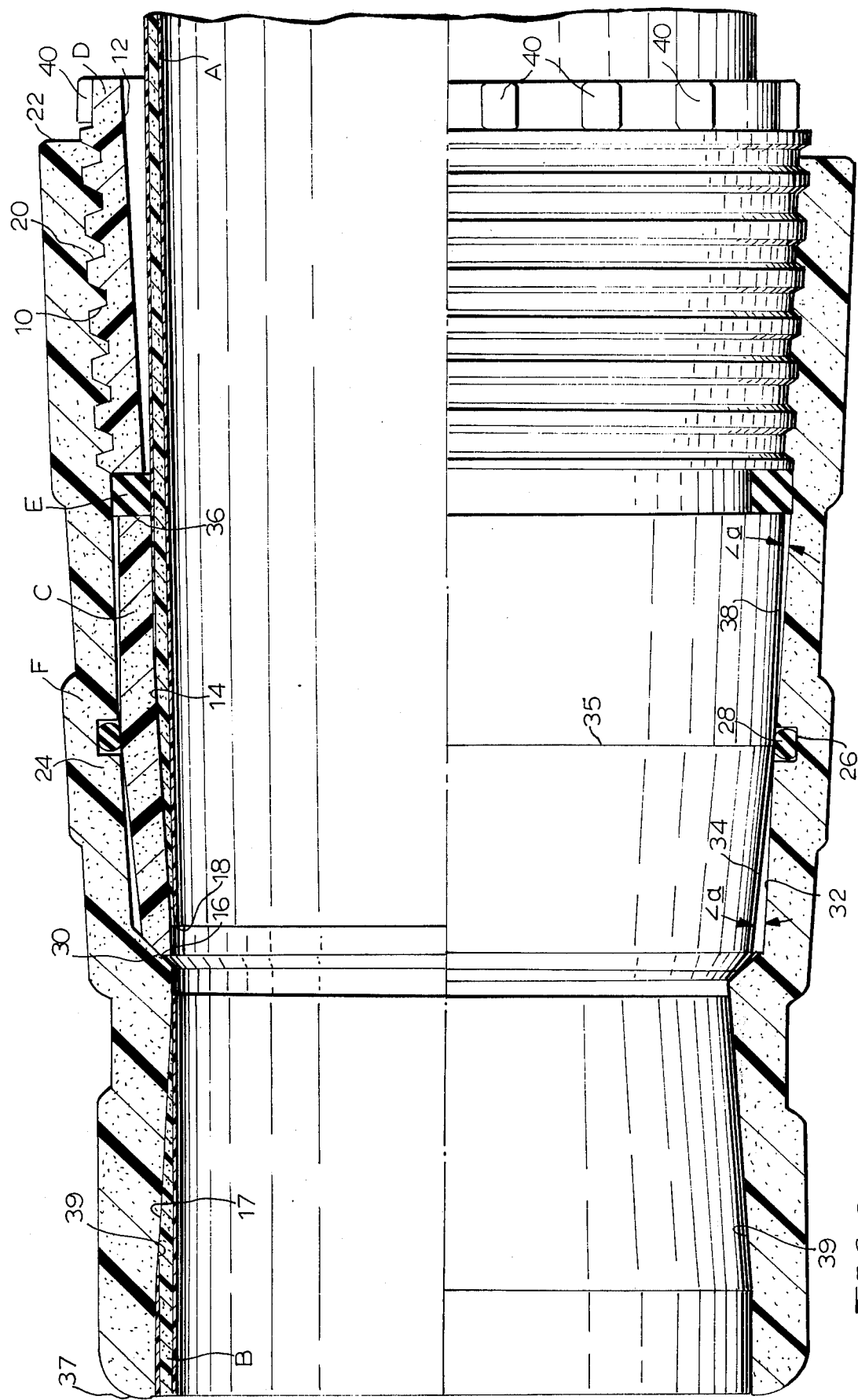

PIPE JOINT

This is a continuation of application Ser. No. 462,574, filed Apr. 19, 1974 now abandoned.

The invention relates to joints for pipe, and is more particularly directed to the provision of means suitable for joining pipe sections which are unduly heavy and/or difficult to seal to one another because of conditions in the field.

BACKGROUND OF THE INVENTION

When laying pipe in a ditch, the bottom of the ditch is never truly level or straight. A ditch will follow the terrain, and the terrain is rarely on a straight line or level. There are rises and dips or fails. Thus, when joining pipe sections, a measure of flexibility at the connected areas or joints is highly desirable without the loss of the seals for the connected parts.

Moreover, when laying and connecting pipe sections of large diameter and of substantial weight, it is difficult to rotate the pipe sections in order to connect them to one another.

SUMMARY OF THE INVENTION

To overcome the problems outlined above, a joint for pipe in accordance with the invention comprises a pipe section, a first sleeve surrounding and bonded to the end of the pipe section, and a second sleeve positioned on the pipe section rearward of the first sleeve. The second sleeve is externally threaded and has an internal diameter greater than the diameter of the pipe section. This second sleeve will serve or act as a male nut in joining a pair of pipe sections. An elastomeric spacer ring is positioned to surround the pipe section intermediate the two sleeves. The first sleeve bonded to the pipe section and the spacer ring prevent removal of the otherwise loose second sleeve. The pipe section to be connected to the first pipe section, or a second pipe section, has a collar or female member bonded thereto and extending from an end of such pipe section. The collar has an internally threaded portion adjacent the forward end thereof for mating engagement with the externally threaded second sleeve or male nut. The collar has a second portion rearward of the threaded portion which is adapted to receive the portion of the first pipe section which has thereon the first sleeve and the spacer ring. This second portion of the collar has an internal annular groove in which a sealing ring is positioned for engagement by the first sleeve.

In accordance with a significant aspect of the invention, the first sleeve is tapered with respect to the portion of the collar rearward of the collar's threaded portion so that when the parts are connected, a ball and socket arrangement of predetermined angular capability is provided which permits a predetermined measure of angular misalignment of one pipe section with respect to the other pipe section. Throughout misalignment of the pipe sections permitted by the joint construction of the invention, the sleeve bonded to one pipe section remains in engagement with the seating ring within the collar bonded to the other pipe section so that the seal between the parts is not lost.

Accordingly, it is an object of the invention to provide a joint for pipe which permits pipe sections to be joined to one another without requiring a pipe section to be rotated.

Another object of the invention is to provide a joint for pipe wherein a measure of flexibility is furnished at the joint, the structure of the joint permitting one pipe section to be misaligned with respect to the other pipe section without the loss of the seal between pipe sections.

A further object of the invention is to provide a joint for pipe sections which is self-aligning.

These, and other objects, advantages and improved results will be apparent from the following detailed description taken in conjunction with the drawings illustrating a preferred embodiment of the invention.

BRIEF DESCRIPTION OF THE DRAWINGS

FIG. 1 is a longitudinal, cross-sectional view showing the ends of a pair of pipe sections provided with joining means prior to the connection of the pipe sections to one another;

FIG. 2 is a view similar to FIG. 1 except that the pipe sections are shown joined to one another;

FIG. 3 is a partial view showing the relationship of the sleeve portion on one pipe section with respect to the adjoining collar portion on the other pipe section when the pipe sections are joined and in one extreme position of misalignment;

FIG. 4 is a view similar to FIG. 3 showing the parts in another position of misalignment; and FIG. 5 is an enlarged view showing a cross section of the pipe wall.

DESCRIPTION OF THE PREFERRED EMBODIMENT

Referring to FIGS. 1 and 2, a joint is provided for the connection of the pipe sections A and B. Preferably the pipe sections are made of glass filaments coated or impregnated with a thermosetting resin, such as an epoxy resin and a suitable hardener, a polyester resin or the like. The pipe may be made continuously and cut into sections of predetermined length, as disclosed in Carter U.S. Pat. No. 3,507,412 granted Apr. 21, 1970. Preferably, the pipe sections are made with a resin liner or inner skin and an outer resin skin 7 on the intermediate wall 8 of resin-impregnated glass filaments, as shown in FIG. 5.

A first sleeve C is positioned upon and bonded to the end of the pipe section A. Prior to securing the sleeve C to the pipe section, a second sleeve D and a spacer ring E of elastomeric material, are slipped onto the pipe section. The ring may be made of rubber, neoprene or any other suitable elastomeric material. The sleeve D is externally threaded at 10 and has an internal diameter 12 which is greater than the diameter of the underlying of the pipe section A. The elastomeric spacer ring E surrounds the pipe section intermediate the sleeves C and D. The spacer ring has an internal diameter slightly larger than the diameter of the pipe. The presence of the sleeve C bonded to the forward or leading end of the pipe section prevents removal of the spacer ring and of the loose-fitting, externally threaded sleeve D. The forward or front sleeve C is bonded to the pipe at the interface of the parts by a suitable thermosetting resin adhesive. The pipe section is ground to provide a bevel or chamfer 14. The bevel extends from the inner skin 6 to the outer skin 7 so that the adjoining inner surface of the sleeve C may be bonded to the resin surfaces provided by the resin skins as well as to the intermediate wall 8 by a similar thermosetting resin. The forward edge or nose 16 of the sleeve C extends beyond or forward of the forward edge 18 of the pipe section A.

The sleeves C and D are preferably made of a glass fiber reinforced thermosetting resin, and preferably they are formed by centrifugal casting. The sleeves may be cast as a single sheet and then cut to furnish the two pieces as shown. Also, the internal surface of each sleeve may have a taper which widens or has an internal diameter which increases slightly toward the right as viewed in FIGS. 1 and 2.

Pipe section B has a collar F bonded to and extending from an end thereof. The collar F may be separately made in the manner disclosed in Carter and Neher U.S. Pat. No. 3,784,239; granted Jan. 8, 1974, and bonded by a suitable thermosetting resin adhesive to the pipe section B. As described with regard to the pipe section A and the sleeve C, the pipe section B is provided with a bevel 17 and the inner surface of the collar is bonded to resin surfaces provided by the skin 6 and 7 as well as to the intermediate wall 8 having glass fibers therein. It is preferred to form the collar directly on the pipe section. This is done by providing a die within the end of the pipe section, the die extending therefrom, winding continuous glass filaments coated or impregnated with a thermosetting resin composition onto the pipe section and die, then curing the resin of the filament wound collar, and removing the die. The die may be of the collapsible type or of a deformable or meltable material, such as low-melting point alloy or a eutectic mixture of inorganic salts. Such alloy or mixture will, of course, have a melting point higher than the curing temperature for the resin.

The collar F has an internally threaded portion 20 adjacent the forward end 22 of the collar for threaded engagement with the externally threaded sleeve D. The collar has a second portion 24 rearward of the threaded portion 20. The portion 24 is adapted to receive the portion of the pipe section A having the sleeve C and the spacer ring E thereon, as shown in FIG. 2. The second portion 24 has an internal annular groove 26 in its wall and a sealing ring 28 is positioned in the groove for engagement with the sleeve C. The collar is also provided with an annular internal shoulder 30 adapted to act as a stop for the pipe section A when the shoulder is engaged by the edge 16 of the sleeve C.

A significant aspect of the invention is the provision of the means for connecting the pipe section with an angular capability; that is to say, a capability to permit a predetermined angular misalignment of adjoining pipe sections to thereby furnish a measure of flexibility of the joint. Also, the pipe sections are self-aligning at the joint. This is accomplished without sacrifice of the seal provided by the engagement of the sleeve C at its external surface with the O-ring 28. The sleeve C is tapered with respect to the internal surface 32 of the portion 24 of the collar so that when the parts are connected, a ball and socket arrangement of predetermined angular capability is furnished and the sleeve remains in engagement with the sealing ring throughout the misalignment of the pipe sections.

In greater detail, the sleeve C has a taper on its outer side 34 which narrows toward the front end 16 of the sleeve. The portion 24 of the collar on its internal surface 32 has a taper which widens or which increases in diameter from the shoulder 30 toward the open end 22 of the collar. Beginning approximately midway of its length, at 35, and continuing to the rear end 36 of the sleeve, the taper may be less pronounced in the area 38. The increasing taper on the internal surface of the collar furnishes the desired spacing opposite the area 38 of the sleeve. The collar is provided with an internal taper 39 which widens or increases in diameter from the shoulder 30 toward the end 37 of the collar which is opposite the end 22. Thus, the taper on the outside of sleeve C with respect to the taper on the adjoining surface 32 of the collar furnishes, when the parts are connected, a predetermined angle of clearance $a$ on each side of the area of engagement of the sealing ring 28 and the sleeve C, as shown in FIG. 2. The angle $a$ is preferably approximately 2°. The predetermined angular capacity or angle $b$, as shown in FIGS. 3 and 4, is twice the angle of clearance, or approximately 4°.

The angular capability is not obtained by reason of large tolerances between the male and female parts. With the joint of the invention, the O-ring 28, which is positoned substantially at the juncture where the tapers on the sleeve C and the collar F meet, is in contact with and does not come away from the surface at the base of the groove 26 and the adjoining surface of the sleeve member C throughout the angle that one pipe section may move with respect to the other pipe section. Also, when the pipe is installed and settles, the O-ring has the same amount of compression throughout the angular misalignment of the adjoining pipe sections having the coupling means of the invention assembled therewith. The O-ring situated substantially at the juncture of the oppositely extending tapers where it is wedged between the adjoining parts, is in compression when the male elements on the pipe section A are inserted in the female collar on pipe section B, and the O-ring is maintained in compression as long as the male nut D is threaded all the way into the collar F. In addition, side loads on the pipe sections are absorbed at the sealing area.

The spacer ring E distributes the axial load which would otherwise be transmitted from the sleeve C to the male nut D. The resiliency of the elastomer spacer ring contributes to the angular capability of the parts as above described. Also, the load is distributed along the line of bonding or the adhesive line between the sleeve C and the underlying pipe section.

To facilitate rotation of the sleeve or male nut D the sleeve may be provided with spaced ribs 40 on the side opposite the side adjacent the spacer ring. The ribs are cooperable with a tool for rotating the sleeve.

It is believed that the advantages and improved results furnished by the joint for pipe of the invention will be apparent from the foregoing description of a preferred embodiment of the invention. Various changes and modifications may be made without departing from the spirit and scope of the invention as sought to be defined in the claims.

We claim:

1. A joint for pipe comprising a first pipe section, a first sleeve surrounding and bonded to the end of the pipe section, a second sleeve on the pipe section rearward of the first sleeve, the second sleeve being externally threaded and having an internal diameter greater than the diameter of the pipe section, an elastomeric spacer ring surrounding the pipe section intermediate the sleeves, the first sleeve and spacer ring preventing removal of the second sleeve from said end of the pipe section, a second pipe section, and a collar bonded to and extending from an end of the second pipe section, the collar having an internally threaded portion adjacent the forward end thereof for engagement with said externally threaded second sleeve, the collar having a second portion rearward of the threaded portion adapted to receive the portion of the first pipe section having said first sleeve and spacer ring thereon, the second portion having an internal annular groove, and a sealing ring in the groove for engagement by said first sleeve, the first sleeve and said second portion of the collar having cooperable means whereby when the parts are connected a ball and socket arrangement of predetermined angular capability will be provided and said first sleeve will remain in engagement with the sealing ring throughout predetermined angular misalignment of the pipe sections.

2. A joint for pipe according to claim 1, wherein the cooperable means comprises a taper on the outer side of the first sleeve narrowing toward the leading end of the first pipe section and an inner taper on the second portion of the collar widening toward the open end of the collar.

3. A joint for pipe according to claim 2, wherein the second sleeve is provided with circumferentially spaced ribs on the side opposite the side adjacent the spacer ring, the ribs being cooperable with a tool for rotating the sleeve.

4. A joint for pipe according to claim 2, wherein, when the parts are connected, the sealing ring is positioned substantially at the juncture where the tapers on the first sleeve and the second portion of the collar meet, and there is a predetermined angle of clearance on each side of the area of engagement of the sealing ring and the first sleeve.

5. A joint for pipe according to claim 4, wherein the predetermined angle of clearance is approximately 2°.

6. A joint for pipe according to claim 1, wherein the predetermined angular capability is approximately 4°.

7. A joint for pipe according to claim 1, wherein the second sleeve is provided with circumferentially spaced ribs on the side opposite the side adjacent the spacer ring, the ribs being cooperable with a tool for rotating the sleeve.

* * * * *

UNITED STATES PATENT AND TRADEMARK OFFICE
CERTIFICATE OF CORRECTION

PATENT NO. : 4,014,568
DATED : March 29, 1977
INVENTOR(S) : J. Warne Carter and Martin Duane Neher It is certified that error appears in the above-identified patent and that said Letters Patent are hereby corrected as shown below:

1) Column 1, line 60, "seating" should read -- sealing --.

2) Column 2, line 50, "of the underlying" should read -- of the underlying portion --.

3) Column 4, line 37, "elastomer" should read -- elastomeric --.

Signed and Sealed this

Twentieth Day of September 1977

[SEAL]

Attest:

RUTH C. MASON
Attesting Officer

LUTRELLE F. PARKER
Acting Commissioner of Patents and Trademarks